(12) United States Patent
Talty et al.

(10) Patent No.: US 8,275,402 B2
(45) Date of Patent: Sep. 25, 2012

(54) ALERT NOTIFICATION NETWORK

(75) Inventors: Timothy J. Talty, Beverly Hills, MI (US); Andrew J. MacDonald, Grosse Pointe Park, MI (US); Varsha Sadekar, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/817,135

(22) Filed: Jun. 16, 2010

(65) Prior Publication Data

US 2010/0302066 A1    Dec. 2, 2010

Related U.S. Application Data

(63) Continuation-in-part of application No. 11/244,761, filed on Oct. 6, 2005, now abandoned.

(51) Int. Cl.
    *H04B 7/00* (2006.01)
(52) U.S. Cl. ............... 455/518; 455/414.2; 455/456.1; 455/456.3; 455/416; 340/438; 340/425.5
(58) Field of Classification Search ............... 455/414.1, 455/414.4, 517–521, 412.2, 509, 456.1, 456.3, 455/456.5, 416; 701/117, 118, 200, 209, 701/210; 340/438, 995.16, 995.23, 425.5
    See application file for complete search history.

(56) References Cited

U.S. PATENT DOCUMENTS

| | | | |
|---|---|---|---|
| 6,611,755 B1 | 8/2003 | Coffee et al. | |
| 6,795,710 B1 | 9/2004 | Creemer | |
| 6,801,139 B2 | 10/2004 | Tretyak, Jr. | |
| 6,832,140 B2 | 12/2004 | Fan et al. | |
| 7,260,472 B2 | 8/2007 | Sutardja | |
| 7,263,368 B2 | 8/2007 | Knauerhase et al. | |
| 7,269,505 B2 | 9/2007 | Zhao et al. | |
| 7,366,606 B2 | 4/2008 | Uyeki | |
| 2001/0001848 A1 | 5/2001 | Oshizawa et al. | |
| 2002/0045455 A1 | 4/2002 | Spratt | |
| 2002/0112240 A1 | 8/2002 | Bacso et al. | |
| 2002/0128000 A1* | 9/2002 | do Nascimento, Jr. | ....... 455/414 |
| 2003/0043059 A1 | 3/2003 | Miller, Jr. | |
| 2003/0060212 A1 | 3/2003 | Thomas | |

(Continued)

FOREIGN PATENT DOCUMENTS

WO    WO2004/099919 A2    11/2004

OTHER PUBLICATIONS

International Search Report for PCT/US06/37297 dataed Apr. 9, 2007 corresponding to this application.

*Primary Examiner* — Sujatha Sharma

(57) ABSTRACT

A network server operable to communicate information over a half-duplex push-to-talk over cellular wireless communication system includes a location manager operable to determine geographic location of a plurality of recipients, an alert notification manager for preparing alert messages based information regarding events and respective geographic locations of the events, and a message delivery notification manager operable to deliver alert messages to the recipients over the half-duplex push-to-talk over cellular wireless communication system based upon the geographic location of each recipient relative to the geographic locations of the events, with the alert messages being delivered to the recipients without completion of calling procedures and incoming call acceptance by the recipients that are required by conventional full-duplex cellular communication systems.

14 Claims, 1 Drawing Sheet

U.S. PATENT DOCUMENTS

| | | |
|---|---|---|
| 2004/0082345 A1 | 4/2004 | Lueckhoff |
| 2004/0181584 A1* | 9/2004 | Rosen et al. .................. 709/206 |
| 2004/0239531 A1 | 12/2004 | Adamczyk |
| 2004/0246144 A1 | 12/2004 | Siegel et al. |
| 2005/0065711 A1 | 3/2005 | Dahlgren et al. |
| 2005/0075095 A1 | 4/2005 | Dillon |
| 2005/0096102 A1* | 5/2005 | Mock et al. ................... 455/574 |
| 2005/0288046 A1* | 12/2005 | Zhao et al. .................... 455/466 |
| 2006/0030347 A1 | 2/2006 | Biswaas |
| 2006/0189337 A1* | 8/2006 | Farrill et al. .................. 455/518 |
| 2007/0049314 A1 | 3/2007 | Balachandran et al. |
| 2007/0287474 A1 | 12/2007 | Jenkins et al. |

* cited by examiner

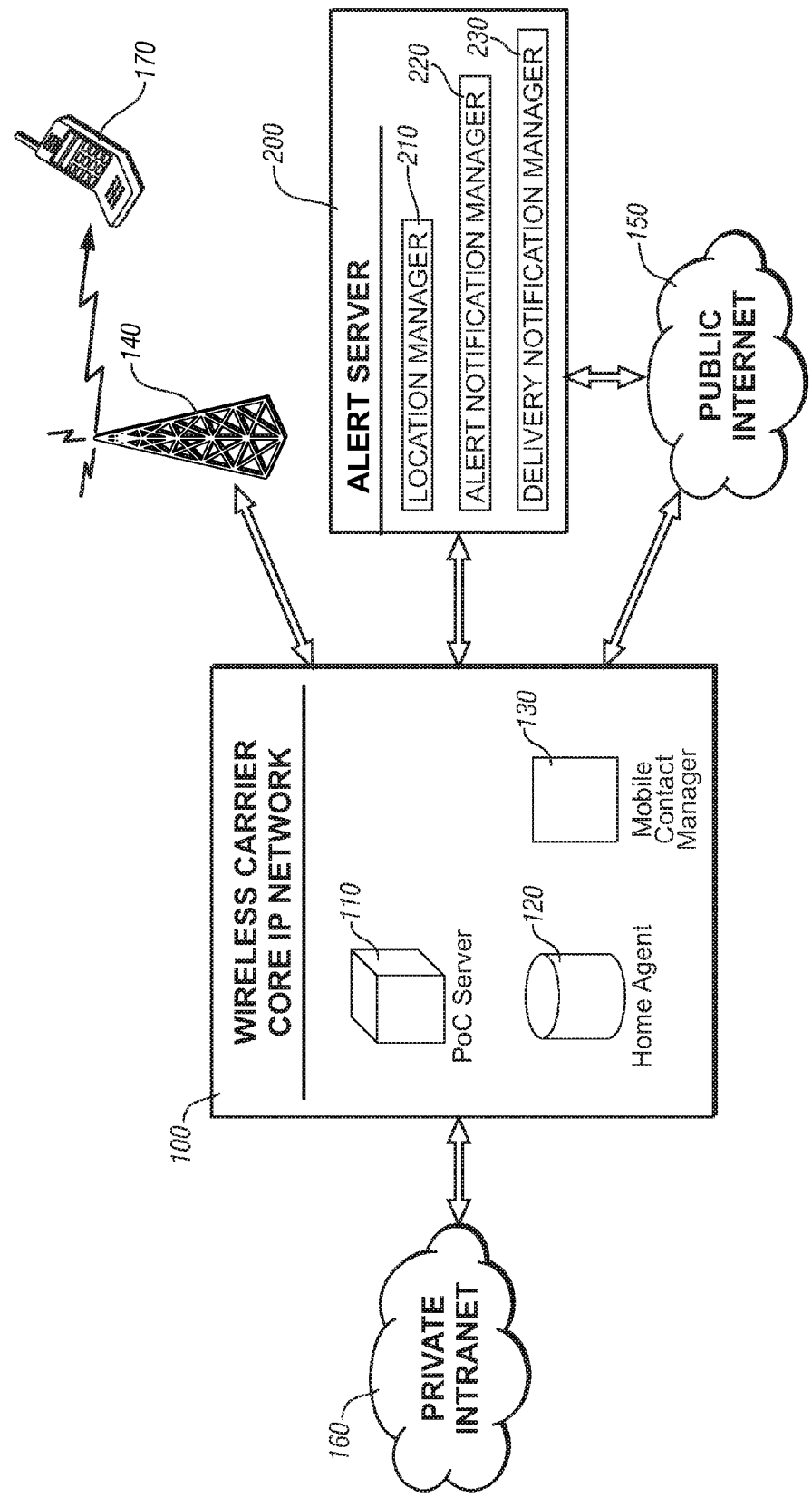

ALERT NOTIFICATION NETWORK

CROSS REFERENCE TO RELATED APPLICATIONS

This application is a continuation-in-part of application Ser. No. 11/244,761, filed Oct. 6, 2005, which is incorporated herein by reference.

TECHNICAL FIELD

This disclosure pertains generally to telematics systems, and more particularly to a method and system to communicate time-critical alerts over a telematics system.

BACKGROUND

The statements in this section merely provide background information related to the present disclosure and may not constitute prior art.

Wireless communication system technologies are rapidly evolving. In a wireless communication system, radiofrequency channels are used to communicate data. Many radio communication systems utilize digital communication techniques in which data is communicated through radio communication channels in digital form. A cellular communication system is one example of such communication systems.

Wireless communications systems suppliers currently provide push-to-talk operation. In this operation of the mobile station, simplex communication of voice data is provided. The push-to-talk capability has attained a level of popularity as nearly-instantaneous voice communications are commenced upon start of the push-to-talk operation of the mobile station.

Conventional cellular communications, generally, do not provide for push-to-talk capability. Rather, call set-up procedures are carried out in a conventional cellular communication system when a call is initiated by a user, and the calling procedures must be successfully completed before voice communications commence. Immediate voice communications are thus unavailable in a conventional cellular communication system, i.e. there is a delay, or latency, in the communications. Additionally, an intended receiver of a call must accept an incoming call for communications to commence.

Mobile communication units, such as cellular phones, personal data assistants, Global Positioning System devices, and on-board vehicle communication units used in conjunction with a Wide Area Network, such as a cellular telephone network or a satellite communication system, have made it possible for a person to send and receive voice communications, data transmissions, and fax messages from virtually any location. Such communication is initiated at the device when it is turned on, or by entering a phone number to be called, or in many cases, by pressing a preprogrammed button on the device or speaking a voice command causing the device to automatically complete the process of dialing the number to be called. A radio communication link is established between the device and a Wide Area Network (WAN), using a node of the WAN in the vicinity of the device.

Push-to-talk-over-cellular (PoC) telephonic service is being developed to provide push-to-talk capability on cellular communications systems. PoC service is a half-duplex form of communications that allows users to engage in immediate communication with one or more receivers, similar to walkie-talkie type operation, simply by pushing a button on their handsets. PoC is an extremely efficient way for network operators to provide an affordable new service to cost-conscious end users while placing a minimum strain on resources. Less bandwidth is required for a PoC call than a regular voice call. In a circuit-switched call, the network capacity is used for the duration of the call, from connection attempt to hang-up. In a PoC call, only the actual blocks of talk that comprise the conversation result in load being placed on the network. This lower resource requirement makes PoC attractive and cost-effective to implement over an existing network. PoC offers the end user a flexible communication option and the convenience of an always-on, virtually instant connection to individuals or groups.

Public Internet and private intranet systems currently gather substantial amounts of information useful to persons having personal wireless communications devices, including those devices implemented in vehicles. Such information may be used by persons to inform their decisions about how and where to proceed. However, access to such information may be difficult to obtain in a timely manner to allow the information to be beneficial to the person.

Therefore, a system that is able to identify and collect time-critical information in a known geographic area is desirable. A telematics communication system and network which is able to provide the time-critical information to persons, e.g., subscribers to a system, in a timely manner relative to when the person comes near or into the presence of a time-critical situation, is desirable. The telematics communication system and network utilizing existing systems to communicate the time-critical information utilizing a push-to-talk cellular networking system is desirable, as is immediately providing such information to the subscriber without the person's inquiry seeking such information.

SUMMARY

A network server operable to communicate information over a half-duplex push-to-talk over cellular wireless communication system includes a location manager operable to determine geographic location of a plurality of recipients, an alert notification manager for preparing alert messages based information regarding events and respective geographic locations of the events, and a message delivery notification manager operable to deliver alert messages to the recipients over the half-duplex push-to-talk over cellular wireless communication system based upon the geographic location of each recipient relative to the geographic locations of the events, with the alert messages being delivered to the recipients without completion of calling procedures and incoming call acceptance by the recipients that are required by conventional full-duplex cellular communication systems.

BRIEF DESCRIPTION OF THE DRAWINGS

One or more embodiments will now be described, by way of example, with reference to the accompanying drawings, in which:

The FIGURE is a system schematic, in accordance with the present disclosure.

DETAILED DESCRIPTION

Referring now to the drawing, wherein the showings are for the purpose of illustration only and not for the purpose of limiting the same, a schematic diagram of a system for notifying a subscriber of time-critical events is shown, in accordance with the present disclosure. The exemplary system for notifying a plurality of subscribers comprises: a wireless carrier core IP network 100, one or more wireless carrier systems 140, a telematics unit 170, and alert server 200.

Telematics unit 170 may be fixedly installed into a motor vehicle, such as an automobile or truck, or other vehicles. Alternatively, the telematics unit may comprise a hand-held device carried by an individual. The telematics unit 170 is preferably equipped with suitable hardware and software for transmitting and receiving voice and data communications. Elements of the telematics unit 170 preferably comprise: a digital signal processor connected to a wireless modem; a global positioning system (GPS) receiver or GPS unit; an electronic memory; a microphone; one or more audio speakers; an embedded telephone or an email access appliance; a real time clock; a display; and a software monitor for reading a time signal of real time clock. The GPS unit provides longitude and latitude coordinates of the device, as well as a time stamp and a date stamp. The telematics unit 170 preferably comprises a cellular communications device having push-to-talk-over-cellular (PoC) capability, and is operable to send and receive over-the-air messages, including those originating from the alert server 200. Thus, one skilled in the art appreciates that telematics unit 170 having PoC capability is configured to receive messages without completion of calling procedures and incoming call acceptance by the recipients that are required by conventional full-duplex cellular communication systems.

The telematics unit 170 sends and receives radio transmissions from wireless carrier core IP network 100 via the one or more wireless carrier systems 140 which are operable to communicate using cellular systems.

Wireless carrier core IP network 100 includes a PoC server 110, a home agent 120, and mobile contact manager 130, which work in conjunction with the alert server 200, to deliver timely and geographic position-appropriate messages to telematics unit 170. The home agent 120 and mobile contact manager 130 are preferably operable to track and manage information about each subscriber, based upon communications through the wireless carrier systems 140.

Wireless carrier core IP network 100 preferably includes services from mobile telephone switching offices, wireless networks, public-switched telephone networks, and Internet protocol (IP) networks. Network 100 comprises a wired network, an optical network, a fiber network, another wireless network, or any combination thereof, and connects to telematics unit 170 via wireless carrier system 140. Wireless carrier core IP network 100 is operable to communicate with various public Internet servers 150 to obtain localized location-specific time-critical information, such as traffic reports, road construction updates. Wireless carrier core IP network 100 is operable to communicate with private intranet servers 160 to obtain similar information of interest.

Wireless carrier core IP network 100 sends and receives messages according to established protocols for cellular phone communications such as IS-637 standards for short message service (SMS), IS-136 air-interface standards for SMS, and GSM 03.40 and 09.02 standards.

The alert server 200 may be incorporated as an element of a call center. The call center comprises a virtual location wherein many calls are received and serviced at the same time, or wherein many calls are sent at the same time. In one embodiment, the call center is a telematics call center, prescribing communications to and from telematics unit 170. In another embodiment, the call center is a voice call center, providing verbal communications between a communication services advisor in the call center and one or more subscribers. In another embodiment, the call center contains each of these functions. In another embodiment, the call center serves as a fully automated center providing telematics service center data, including execution of the functions of the alert server 200.

Communication services advisor may be a real advisor or a virtual advisor. A real advisor is a human being in verbal communication with a user or subscriber. A virtual advisor is a synthesized voice interface responding to requests from user or subscriber. In one embodiment, virtual advisor includes one or more recorded messages. In another embodiment, virtual advisor generates voice messages using a text to speech synthesis engine (TTS). In another embodiment virtual advisor includes both recorded and TTS generated messages.

The system for notifying a subscriber of time-critical events includes the alert server 200 operable to collect, aggregate, and communicate time-critical information over the wireless carrier core IP network 100. The alert server comprises a location manager 210, an alert notification manager 220, and a message delivery notification manager 230. The wireless communications system preferably comprises the PoC communications system, as previously discussed. The location manager 210 is operable to identify and locate telematics units within a known geographical area. The term "recipient" as used herein describes a telematics unit receiving the time-critical information. The time-critical information is communicated to the recipient via wireless communications system described herein including PoC, whereby the alert messages are delivered to the recipients without completion of calling procedures and incoming call acceptance by the recipients that are required by conventional full-duplex cellular communication systems.

The message delivery notification manager 230 is operable to schedule and format delivery of alert messages to the recipients, consistent with the specific communications system and telematics hardware and operating system. The message delivery notification manager 230 schedules and formats delivery of various time-critical alert messages to each recipient, based upon location and direction of travel of each of the recipients.

The alert notification manager 220 receives and aggregates alert messages, including a geographic location of the source of the alert, and prepares the aggregated alert messages for delivery. The alert server 200 works with the alert notification manager 220 to collect time-critical information from various sources which is formed into the alert messages. Collecting time-critical information includes identifying available services compatible with network latencies; and, collecting appropriate time-critical messages consistent with the identified services. Exemplary vehicle time-critical information that may be compiled, aggregated and communicated to subscribers in alert messages may include, for example, warning of approaching emergency vehicles; warnings of approaching sharp curves, low or narrow bridges, or other non-obvious road features; warnings of road surface changes due to ambient conditions, e.g. fog, ice, drifting snow, water, flooding; warnings of approaching rail trains for collision avoidance; Amber alert details; warnings of approaching work zones; and, warnings of approaching traffic congestion or changed traffic patterns, and warning of vehicle approach to a school zone wherein speed limits are restricted at specific times of the day. Other specific information may be developed and implemented according to needs of an individual network, consistent with the communications ability of the network system and the vehicles. Other specific services compatible with network latencies currently comprise services able to accept a latency of approximately one second, due to current delay times of the PoC cellular system. It is envisioned that additional alert messages may become appropriate for communication to subscribers when delay times of the PoC cellular system decrease with the advent of new technology.

In operation, the alert server 200 acts to push communications of alert messages to each subscriber, based upon each recipient's location and direction of travel relative to location of each known time-critical event or location, whereby the alert messages are delivered to the recipients without completion of calling procedures and incoming call acceptance by the recipients that are required by conventional full-duplex cellular communication systems. Each recipient's location and direction of travel can be determinable using information from the GPS transponder. The alert messages are preferably pushed to each subscriber through the subscriber's telematics device 170, and may take the form of a voice message heard audibly by the subscriber, or in the form of a written message printed on a visual display such as a vehicle information center, or in the form of an audible alert coupled with a written message, or in the form of a bank of lamps viewable by the subscriber, which are associated with various alert messages.

The alert server 200 collects and receives time-critical information from a variety of sources, including information available on the Internet 150, and information developed on the server's private intranet 160. The information developed on the server's private intranet 160 may comprise electronically available information, or information collected or captured and interpreted by a human operator who is able to encode the information in a manner suitable for use by the server.

The subscriber may desire regular notification of specific events or kinds of events. One example of event notification is traffic conditions. In this case, the network may regularly capture traffic events from public and private sources that are relevant to the subscriber's geographic location and direction of travel, and provide such information on a scheduled basis, including a notification that there are no incidences for which the subscriber has cause for concern.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Network server operable to communicate information over a half-duplex push-to-talk over cellular wireless communications system, comprising:
   a location manager operable to determine geographic location of a plurality of recipients;
   an alert notification manager for preparing alert messages based upon information regarding events and respective geographic locations of the events; and
   a message delivery notification manager operable to deliver alert messages to the recipients over the half-duplex push-to-talk over cellular wireless communication system based upon the geographic location of each recipient relative to the geographic locations of the events, with the alert messages being delivered to the recipients without completion of incoming call acceptance by the recipients that are required by conventional full-duplex cellular communication systems;
   wherein the network server is operable to:
      identify available services compatible with network latencies due to delay times of the push-to-talk over cellular wireless communication system; and
      collect appropriate alert messages consistent with the identified services.

2. The network server of claim 1, wherein the location manager is further operable to determine direction of travel of the plurality of recipients, and the message delivery notification manager is further operable to deliver alert messages to the recipients based upon the direction of travel of each recipient relative to the geographic locations of the events.

3. The network of claim 1, wherein the push-to-talk over cellular wireless communication system further includes a wireless carrier core IP network.

4. The network server of claim 3, wherein the wireless carrier core IP network is operably connected to a private intranet service.

5. The network server of claim 3, wherein the wireless carrier core IP network is operably connected to a public internet service.

6. The network server of claim 1, wherein each recipient comprises an on-board vehicular telematics unit.

7. The network server of claim 1, wherein the alert location manager is operable to identify each recipient, and the message delivery notification manager is operable to schedule and format delivery of alert messages consistent with specific communication systems of the identified recipients.

8. The network server of claim 1, wherein the alert notification manager is operable to receive and aggregate alert messages.

9. The network server of claim 1, wherein services compatible with network latencies comprise services able to accept a latency of approximately one second.

10. Wireless network server adapted to collect, aggregate, and communicate vehicle related information to a plurality of vehicular telematics units, comprising:
    a vehicle location manager operable to identify a geographic location and direction of travel of each vehicular telematics unit;
    an alert notification manager for receiving information related to events and preparing alert messages based upon respective geographic locations of the events; and,
    a message delivery notification manager operable to deliver alert messages to each of the plurality of telematics units over a half-duplex push-to-talk over cellular wireless communication system based upon the geographic location and direction of travel of each of the vehicular telematics units relative to the geographic locations of the events, where the alert messages are delivered to the vehicular telematics units without completion of incoming call acceptance by the vehicular telematics units that are required by conventional full-duplex cellular communication systems;
    wherein the wireless network server is operable to:
       identify available services compatible with network latencies due to delay times of the push-to-talk over cellular wireless communication system; and
       collect appropriate alert messages consistent with the identified services.

11. The wireless network server of claim 10, wherein the alert notification manager is operable to receive and aggregate alert messages.

12. The wireless network server of claim 11, wherein the alert notification manager is further operable to prepare the aggregated alert messages for delivery.

13. The wireless network server of claim 12, wherein the message delivery notification manager is further operable to schedule and format delivery of the alert messages consistent with specific communication systems of the vehicular telematics units.

14. Method for communicating information through a half-duplex push-to-talk over cellular wireless communications system, comprising: interfacing a network server with a wireless carrier core IP network, the network server operable to:
- locate and determine direction of travel of push-to-talk telematics units within a geographic area;
- receive alert messages related to events and respective geographic locations of the events;
- aggregate the alert messages;
- prepare the alert messages for delivery, where the prepared alert messages include the respective geographic locations of the events;
- schedule and format the alert messages for delivery to the push-to-talk telematics units over the half-duplex push-to-talk over cellular wireless communication system, based upon the geographic location and direction of travel of each push-to-talk telematics units relative to the geographic locations of the events, where the alert messages are delivered to the push-to-talk telematics units without completion of incoming call acceptance by the push-to-talk telematics units that are required by conventional full-duplex cellular communication systems;
- identify available services compatible with network latencies due to delay times of the push-to-talk over cellular wireless communication system; and
- collect appropriate alert messages consistent with the identified services.

* * * * *